United States Patent
Van Havenbergh et al.

[11] Patent Number: 5,334,842
[45] Date of Patent: Aug. 2, 1994

[54] RADIOGRAPHIC SCREEN

[75] Inventors: Jan Van Havenbergh, Zwijndrecht; Philip Dooms, Edegem; Jozef Aertbelien, Schilde, all of Belgium; Harald Blum, Wachtendonk, Fed. Rep. of Germany

[73] Assignee: Agfa-Gevaert, N.V., Mortsel, Belgium

[21] Appl. No.: 70,954

[22] Filed: Jun. 4, 1993

[30] Foreign Application Priority Data

Jun. 16, 1992 [EP] European Pat. Off. ........ 92201760.3

[51] Int. Cl.$^5$ ............................................. G01T 1/202
[52] U.S. Cl. .................................................. 250/483.1
[58] Field of Search ................... 250/483.1, 581, 367; 427/385.5

[56] References Cited

U.S. PATENT DOCUMENTS 5,017,440  5/1991  Bills et al. .................... 250/483.1
5,179,284  1/1993  Kingsley et al. .............. 250/370.11

Primary Examiner—Paul M. Dzierzynski
Assistant Examiner—Richard Hanig
Attorney, Agent, or Firm—Breiner & Breiner

[57] ABSTRACT

A radiographic screen comprising (1) a metal or hydrophobic resin support, (2) a layer comprising a fluorescent phosphor dispersed in an organic polymeric binder and (3) an optionally present outermost organic polymer coating protecting said phosphor layer against abrasion, characterised in that the edges (side surfaces) of said screen are covered with a polymer material being formed essentially from a moisture-hardened polymer composition.

12 Claims, 2 Drawing Sheets

RADIOGRAPHIC SCREEN

FIELD OF THE INVENTION

The present invention relates to a radiographic screen having improved mechanical strength and shock resistance.

BACKGROUND OF THE INVENTION

In a conventional radiographic system an X-ray radiograph is obtained by X-rays transmitted imagewise through an object and converted into light of corresponding intensity in a so-called intensifying screen (X-ray conversion screen) wherein phosphor particles absorb the transmitted X-rays and convert them into visible light and/or ultraviolet radiation to which a photographic film is more sensitive than to the direct impact of X-rays.

In practice the light emitted imagewise by said screen irradiates a contacting photographic silver halide emulsion layer film which after exposure is developed to form therein a silver image in conformity with the X-ray image.

For use in common medical radiography the X-ray film comprises a transparent film support double-side coated with a silver halide emulsion layer. During the X-ray irradiation said film is arranged in a cassette between two X-ray conversion screens each of them making contact with its corresponding silver halide emulsion layer.

Single-side coated silver halide emulsion films combined in contact with only one screen are often used in autoradiography and to improve image definition which is of great importance, e.g. in mammography and in particular fields of non-destructive testing (NDT) known as industrial radiography. An autoradiograph is a photographic record formed through the intermediary of penetrating radiation emitted by radioactive material contained in an object, e.g. microtome cut for biochemical research.

Phosphors suited for use in the conventional radiographic system must have a high prompt emission on X-ray irradiation and low afterglow in favour of image sharpness.

More recently (see e.g. U.S. Pat. No. 3,859,527 and the periodical Radiology, Sept. 1983) an X-ray recording system has been developed wherein photodestimulable storage phosphors are used having in addition to their immediate light emission (prompt emission) on X-ray irradiation the property to store temporarily a large part of the energy of the X-ray image which energy is set free by photostimulation in the form of light different in wavelength characteristic from the light used in the photostimulation. In said X-ray recording system the light emitted on photostimulation is detected photoelectronically and transformed into sequential electrical signals.

The basic constituents of such X-ray imaging system operating with storage phosphors are an imaging sensor containing said phosphor, normally a plate or panel, which temporarily stores the X-ray energy pattern, a scanning laser beam for photostimulation, a photoelectronic light detector providing analogue signals that are converted subsequently into digital time-series signals, normally a digital image processor which manipulates the image digitally, a signal recorder, e.g. magnetic disk or tape, and an image recorder for modulated light exposure of a photographic film or an electronic signal display unit, e.g. cathode-ray tube.

The terminology X-ray conversion screen as used herein refers to screens for use in conventional screen-film combinations or for use in stimulated luminescence radiography.

From the preceding description of said two X-ray recording systems operating with X-ray conversion phosphor screens in the form of a plate or panel it is clear that said plates or panels serve only as intermediate imaging elements and do not form the final record. The final image is or reproduced on a separate recording medium or display. The phosphor plates or sheets can be used repeatedly. Before re-use of the photostimulable phosphor panels or sheets, a residual energy pattern is erased by flooding with light. The expected life of the plate is limited mainly by mechanical damage.

Common X-ray conversion screens comprise in order: a support, a layer comprising phosphor particles dispersed in a suitable binder and a transparent protective coating applied to the phosphor containing layer to protect said layer during use.

Since in the above-described X-ray recording systems the X-ray conversion screens are used repeatedly, it is important to provide them with an adequate topcoat for protecting the phosphor-containing layer from mechanical and chemical damage. This is particularly important for photostimulable radiographic screens where each screen normally is not encased in a cassette but is transported and handled as such.

Further, the lifetime of the radiographic screen is markedly prolonged by additional protection of the side surfaces of the screen, so-called edge-reinforcement, giving adequate protection against mechanical shocks occuring in transport outside a cassette. Particularly when operating storage phosphor screens in a continuous cycle of exposing the stimulable phosphor screen to radiation, reading out the radiation image recorded therein, and removing the remaining radiation energy the screen has to be moved through various processing stations, normally by roller transport. The repeated introduction of the screens between the nip of the transport rollers produces mechanical shocks that in the longer term cause damages resulting in abrasion and/or stripping of the phosphor containing layer. Edge reinforcement offers a solution to that problem.

The edge reinforcing coating should exhibit good adhesive properties towards chemically quite distinct materials; (1) the support material, e.g. polyester, (2) the phosphor layer composition comprising inorganic phosphor pigments bond by a small amount of an organic binder medium, and optionally the material of a protective topcoat. By poor adhesion to one or more of these elements the benefit of the inherent high abrasion resistance and mechanical strength of an edge reinforcing coating may be lost.

Edge-reinforcement of phosphor screens, particularly stimulable phosphor screens has been described e.g. in U.S. Pat. No. 4,788,435 according to which the side surfaces of a phosphor screen panel are covered with a polymer material composed of a linear polyester or a mixture of a linear polyester and a vinyl chloride-vinyl acetate copolymer.

According to said prior art the edge-reinforcement is performed by dissolving the polymer material in a relatively large amount of solvent of the aromatic type (toluene) and applying the solution to the edge faces of the screen and then drying the coating of the solution.

Where possible the use of aromatic (toxic and inflammable) solvents should be avoided for ecological reasons.

OBJECTS OF THE INVENTION

It is an object of the present invention to provide a radiographic screen the side surfaces or edges of which are coated with a polymer composition from ecologically acceptable solvent(s).

It is a further object of the present invention to provide a radiographic screen the edges of which are reinforced by a polymer coating obtaining high resistance to abrasion by curing.

More in particular it is an object of the present invention to provide a radiographic screen, the edges of which are reinforced by a cured organic polymer composition exhibiting good adhesive properties to (1) a metal support or hydrophobic resin support e.g. made of polyethylene terephthalate, to (2) a phosphor layer containing phosphor particles dispersed in an organic polymeric binder and to (3) (when present) an outermost protective polymer coating.

Further objects and advantages will become apparent from the description hereinafter.

SUMMARY OF THE INVENTION

According to the present invention there is provided a radiographic screen comprising (1) a metal or hydrophobic resin support, (2) a layer comprising a fluorescent phosphor dispersed in an organic polymeric binder and (3) an optionally present outermost organic polymer coating protecting said phosphor layer against abrasion, characterised in that the edges (side surfaces) of said screen are covered with a polymer material being formed essentially from a moisture-hardened polymer composition prepared by a process comprising the steps of:

(I) mixing in at least one solvent following components (A) and (B) :

(A) 30 to 99 parts by weight of at least one copolymer of olefinically unsaturated compounds having a weight-average molecular weight $[\overline{Mw}]$ of at least 1500 and containing chemically incorporated moieties capable of undergoing an addition reaction with amino groups, and (B) 1 to 70 parts by weight of organic substances containing blocked amino groups which are capable of forming under the influence of moisture free primary and/or secondary amino groups, wherein (i) the copolymers of component (A) contain intramolecularly bound carboxylic anhydride moieties, with the anhydride equivalent weight of the copolymers being from 393 to 9,800, and the still unhardened composition contains from 0.25 to 10 anhydride moieties for each blocked amino group, II) coating the obtained mixture onto at least one side surface (edge) of said fluorescent screen, and (III) allowing moisture (H$_2$O) to come into contact with the coated mixture essentially consisting of the above defined components (A) and (B).

DETAILED DESCRIPTION OF THE INVENTION

Figure 1:
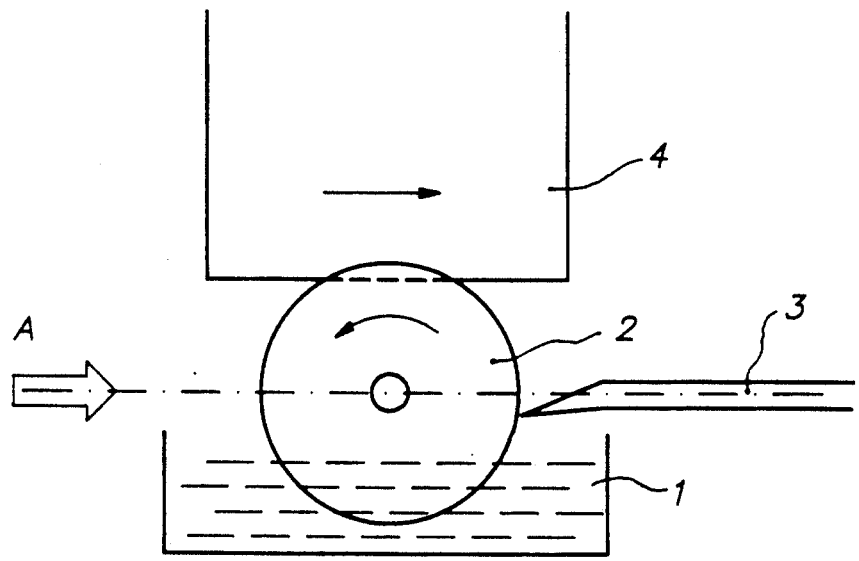
FIG. 1 is a diagrammatic front view representation of a coating device suited for applying the radiation curable composition of the present invention to the edges of a radiographic screen.

According to an embodiment, the edge-reinforcing polymer composition used according to the present invention is obtained by mixing:

(A) 50 to 97 parts by weight of (a) copolymer(s) of maleic anhydride with at least one other olefinically unsaturated monomer, said copolymer(s) containing addition polymerized maleic anhydride units and having a weight-average molecular weight (Mw) of 1,500 to 75,000, and (B) 3 to 50 parts by weight of at least one organic substance containing blocked amino groups, said substance having a molecular weight of 86 to 10,000.

According to a preferred embodiment component (A) consists essentially of a copolymer of:

a) 3 to 25 parts by weight of maleic anhydride, and b) 75 to 97 parts by weight of at least one copolymerisable monomer selected from the group corresponding to the following general formulae (I), (II) and (III) :

wherein :

each of R$_1$ and R$_4$ independently of each other represents an aliphatic or cycloaliphatic C$_1$-C$_{18}$ hydrocarbon group in which one or more carbon atoms may be replaced by heteroatoms selected from the group consisting of oxygen, sulphur and nitrogen, R$_2$ is hydrogen, methyl, ethyl, chlorine or fluorine, and R$_3$ is a C$_2$-C$_{15}$ aliphatic hydrocarbon group, a C$_5$-C$_{10}$ cycloaliphatic hydrocarbon group, a C$_7$-C$_{18}$ aliphatic hydrocarbon group, a C$_6$-C$_{12}$ aromatic hydrocarbon group containing one or more heteroatoms selected from the group consisting of oxygen, sulphur and nitrogen in the form of ether, ester, amide, urethane, urea, thioester, oxirane, ketone, lactam or lactone group; and wherein component (B) is a compound selected from the group consisting of an aldimine, ketimine, oxazolane, hexahydropyrimidine, tetrahydroimidazole, dihydroimidazole, tetrahydropyrimidine, amidacetal and amidaminal.

The polymeric product obtained in curing the above-defined composition with the aid of water (moisture) results from the hydrolysis of the blocked amine moieties of component (B), whereby one hydroxyl group is formed per amino group (primary or secondary amino group). These groups, especially said amino groups, enter into rapid cross-linking reaction with the anhydride groups of copolymer (A).

According to a particular embodiment the copolymer containing anhydride groups contains additionally epoxide groups as described in U.S. Pat. No. 4,904,740, wherein the last mentioned groups also take part in a crosslinking reaction with free amino groups.

Preferred maleic anhydride copolymers (A) have a weight-average molecular weight [$\overline{Mw}$] determined by gel chromatography of 3,000 to 50,000. Their anhydride equivalent weight (- quantity in gram containing 1 mole of anhydride groups) is from 3,800 to 393 and preferably from 2,000 to 450. They are produced in known manner by radically initiated copolymerisation, preferably in the presence of organic solvents. Suitable solvents for that purpose are given in U.S. Pat. No. 4,975,493 which also mentions detailed preparation examples of such copolymers. Preferred maleic anhydride copolymers for use according to the present invention contain styrene, methacrylate and/or acrylate units.

The radical formers applied in the copolymerisation process are those suitable for reaction temperatures of 60° to 180 ° C. such as organic peroxides and other radical formers mentioned in U.S. Pat. No. 4,975,493.

Preferably used blocked amines are oxazolanes, e.g. those described in said U.S. Pat. No. 4,975,493. Blocked amines containing aldimine or ketimine groups for generating free amine with water are described in U.S. Pat. No. 4,937,293. Blocked amines containing hexahydropyrimidine, tetrahydropyrimidine, or tetrahydroimidazole moieties for generating free amino groups are described in U.S. Pat. No. 4,970,270. Blocked amines being amidacetal or amidaminal compounds are described in published European Patent Application 346669.

The blocked amines representing said component (B) have preferably a molecular weight of from 86 to 10,000, preferably from 250 to 4,000 and contain a statistical average of from 1 to 50, preferably 1 to 10, especially 2 to 4 structural units corresponding to at least one of the following general formulae (IV), (V), (VI), (VII), (VIII) and (IX):

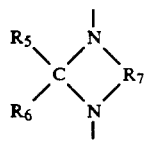
(IV)

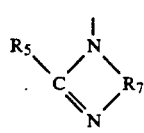
(V)

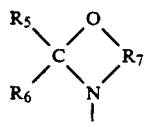
(VI)

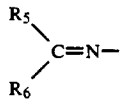
(VII)

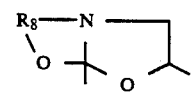
(VIII)

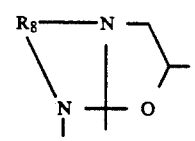
(IX)

wherein :

each of $R_5$ and $R_6$ independently of each other represents hydrogen, an aliphatic hydrocarbon group containing from 1 to 18 carbon atoms, a cycloaliphatic hydrocarbon group containing from 5 to 10 carbon atoms, an aliphatic hydrocarbon group containing from 7 to 18 carbon atoms or a phenyl group, or $R_5$ and $R_6$ represent together the necessary atoms to form a five- or six-membered cycloaliphatic ring with the carbon atom whereto they are commonly linked, $R_7$ represents a divalent aliphatic hydrocarbon group containing 2 to 6 carbon atoms, but having only a chain of 2 to 3 carbon atoms between the defined heteroatoms of the ring, $R_8$ represents a divalent aliphatic hydrocarbon group having 2 to 10 carbon atoms, but having only 2 or 3 carbon atoms between the heteroatoms whereto said group is linked.

General formula (IV) includes 5-membered tetrahydro-imidazole and 6-membered hexahydropyrimidine structural units. General formula (V) includes 5-membered dihydro-imidazole and 6-membered tetrahydropyrimidine structural units. General formulae (VI), (VII), (VIII) and (IX) relate respectively to oxazolane (VI), aldimine and ketimine (VII), bicyclic amide acetal (VIII) and bicyclic amide aminal (IX) structural units.

Preparation examples of compounds including structural units within the scope of said general formulae are given in U.S. Pat. No. 4,975,493, 4,937,293, 4,970,270 and in published EP application 0 346 669.

Suitable aldehydes or ketones for reaction with polyamines to prepare said blocked amines containing hexahydropyrimidine, tetrahydropyrimidine or tetrahydroimidazole units as described above correspond to the following general formula :

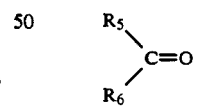

wherein $R_5$ and $R_6$ have the same meaning as described above, and preferably having a molecular weight of from 72 to 200 for the ketones, and from 58 to 250 for the aldehydes.

The following are examples of these compounds : methyl ethyl ketone, methyl propyl ketone, methyl isopropyl ketone, methyl-n-butyl ketone, methyl-n-amyl ketone, diethyl ketone, cyclohexanone, methyl-tert.-butyl ketone, 3,3,5-trimethyl -cyclohexanone, isobutyraldehyde, 2,2-dimethylpropanal, 2-ethylhexanal, hexanal, octanal, hexahydrobenzaldehyde.

The polyamines used for the preparation of the compounds containing hexahydropyridine or tetrahydroimidazole groups are in particular organic compounds containing at least 2 primary and/or secondary amino groups.

Suitable polyamines are, e.g. those corresponding to the following general formula:

$$R_8-NH-R_7-NH-R_9$$

in which : $R_7$ has the meaning indicated above, and each of $R_8$ and $R_9$ (same or different) denote hydrogen, aliphatic hydrocarbon groups containing 1 to 10, preferably 1 to 4 carbon atoms, cycloaliphatic hydrocarbon groups containing 5 to 10, preferably 6 carbon atoms or aromatic hydrocarbon groups containing 7 to 15, preferably 7 carbon atoms, and the above-mentioned hydrocarbon groups, in particular the aliphatic hydrocarbon groups, may contain heteroatoms such as oxygen, nitrogen or sulphur in the form of ether, ester, amide, urethane, oxirane, ketone, lactam, urea, thioether, thioester or lactone groups, and may also contain reactive hydroxyl or amino groups.

Particularly preferred polyamines are those in which $R_8$ and $R_9$(identical or different) stand for an alkyl group such as methyl, ethyl, n-propyl, isopropyl , n-butyl , isobutyl , tert.-butyl, n-pentyl or n-hexyl and at least one of the groups denoted by $R_8$ and $R_9$ is a group obtainable by the addition of an amine hydrogen atom to an olefinically unsaturated compound. Examples of olefinically unsaturated compounds suitable for the preparation of such modified polyamines include derivatives of (methyl)acrylic acid such as the esters, amides or nitriles thereof or, e.g. aromatic vinyl compounds such as styrene, α-methylstyrene or vinyl toluene or, e.g. vinyl esters such as vinyl acetate, vinyl propionate or vinyl butyrate or, for example, vinyl ethers such as ethyl vinyl ether, propyl vinyl ether, butyl vinyl ether or mono- or diesters for fumaric acid, maleic acid or tetrahydrophthalic acid.

$R_8$ and/or $R_9$ may also stand for an aminoalkyl or hydroxyalkyl group containing, e.g. 2 to 4 carbon atoms.

Ethylene diamine, 1,2-propylene aliamine, 1,3-propylene aliamine, 1,2- and 1,3-butylene diamine and diethylene triamine are particularly useful.

The preferred compounds containing aldimine or ketimine groups include compounds containing structural units of the following general formula ($R_5$ and $R_6$ having the meaning defined above):

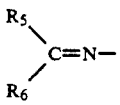

These compounds in principle may be prepared from the aldehydes or ketones already mentioned above as examples. Preferred aldehydes and ketones used for this purpose include isobutyraldehyde, 2,2-dimethylpropanal, 2-ethylhexanal, hexahydrobenzaldehyde and especially those ketones which have a boiling point below 170° C. and are readily volatile at room temperature, e.g. methyl isobutyl ketone, methyl isoprepyl ketone, diethyl ketone, diisobutyl ketone and methyl tert.-butyl ketone.

The polyamines used for the preparation of component B) containing ketimine or aldimine groups may in particular be organic compounds containing at least 2 aliphatically and/or cycloaliphatically bound primary amino groups. Although polyamines containing aromatically bound amino groups may also be used, they are less preferred. The polyamines generally have a molecular weight of from 60 to 500, preferably from 88 to 400, although prepolymers with a relatively high molecular weight containing amino end groups may also be used as polyamine components for the preparation of component B).

Diprimary aliphatic and cycloaliphatic diamines are particularly preferred polyamines, e.g. tetramethylene diamine, hexamethylene diamine, isophorone diamine, bis(4-amino-cyclohexyl)-methane, bis-aminomethylhexahydro-4,7-methanoindane, 1,4-cyclohexanediamine, 1,3-cyclohexane diamine, 2-methyl cyclohexane diamine, 4-methyl cyclohexane diamine, 2,2,5-trimethylhexane diamine, 2,2,4-trimethylhexane diamine, 1,4-butane diol-bis(3-aminpropyl )-ether, 2,5-diamine-2,5-dimethylhexane, bis-aminomethylcyclohexane. bis(4-amino-3,5-dimethylcyclohexy )-methane and mixtures thereof.

Tetramethylene diamine, hexamethylene diamine, isophorone diamine, bis-aminomethyl-cyclohexane, 1,4-cyclohexane diamine, bis-aminomethyl-hexahydro-4,7-methanoindane and bis(4-amino-cyclohexyl)-methane are particularly preferred.

The aldimines and ketimines may be prepared not only from these preferred diamines but also from prepolymers containing primary amino end groups, i.e. compounds in the molecular weight range of from 500 to 5,000, preferably from 500 to 2,000, containing at east two amino end groups. These groups include. e.g. the amino polyethers known from polyurethane chemistry, such as these described, e.g. in EP-A-0-081701 or, e.g. compounds containing amide, urea, urethane or secondary amino groups obtained as reaction products of difunctional or higher functional carboxylic acids, isocyanates or epoxides with diamines of the type exemplified above, which reaction products still contain at least two primary amino groups. Mixtures of such relatively high molecular weight polyamines with the low molecular weight polyamines exemplified above may also be used.

The aromatic polyamines which in principle may be used for the preparation of the aldimines or kerimines but are less preferred include, e.g. 2,4- and 2,6-diaminotoluene, 1,4-diaminobenzene and 4,4'-diaminodiphenylmethane.

The compound (B) containing bicyclic amide acetal groups can be obtained in a manner known per se by reaction of compounds containing epoxy or cyclic carbonate groups with cyclic amino esters such as, for example, oxazolines or oxazines. Preferably, the starting components in this reaction are used in such relative amounts that a total of 1.0 to 1.1 oxazoline or oxazine groups is present for every epoxy or cyclic carbonate group. This type of reactions, which lead to compounds having bicyclic amide acetal groups, are described in detail, e.g. in R. Feinauer, Liebigs Ann. Chem. 698, 174 (1966).

The oxazolines or oxazines which are used for the preparation of the bicyclic amide acetals can be prepared by methods known from the literature, e.g. by reaction of carboxylic acids or anhydrides thereof with hydroxyamines with the elimination of water or by reaction of nitriles with hydroxyamines with the elimination of ammonia. This type of reactions is described, e.g. in J. Org. Chem. 26, 3821 (1961), H. L. Wehrmeister, J. Org. Chem. 27, 4418 (1962) and P. Allen, J. Org. Chem. 28, 2759 (1963).

Oxazolines or oxazines which contain hydroxy groups can also be converted into higher-functional oxazolines or oxazines, e.g. by reaction with organic polyisocyantes.

Bicyclic amide aminals which are suitable according to the invention as component B) can be obtained, e.g. by reaction of tetrahydropyrimidines or dihydroimidazoles with organic epoxides or cyclic carbonates.

In this reaction, monofunctional tetrahydropyrimidines or dihydroimidazoles can be reacted with monofunctional epoxides or carbonates, polyfunctional tetrahydropyrimidines or dihydroimidazoles with monofunctional epoxides or carbonates, monofunctional tetrahydropyrimidines or dihydroimidazoles with polyfunctional epoxides or carbonates.

The tetrahydropyrimidines or dihydroimidazoles used for the preparation of the bicyclic amide aminals can be prepared by methods known from the literature, e.g. by reaction of carboxylic acids with diamines with the elimination of water, or by reaction of nitriles with diamines with the elimination of ammonia. This type of reaction is described, e.g. in DE-OS (German Offenlegungsschrift) 3,640,239.

For the preparation of polymeric dihydroimidazole compounds reference is made to GB-P 1,221,131.

Compounds containing oxazolane groups of the general formula (VI) are especially preferred as component B). They are preferably compounds in which $R_5$ and $R_6$, which may be identical or different, denote hydrogen, aliphatic hydrocarbon groups containing from 1 to 18 carbon atoms, cycloaliphatic hydrocarbon groups containing from 5 to 10 carbon atoms, araliphatic hydrocarbon groups containing from 7 to 18 carbon atoms or phenyl groups, or the two groups $R_5$ and $R_6$ together with the adjacent carbon atom may form a five - six-membered cycloaliphatic ring, and $R_7$ denotes a divalent aliphatic hydrocarbon group containing 2 to 6 carbon atoms, with the proviso that there are 2 or 3 carbon atoms between both nitrogen atoms.

Components B) containing oxazolane groups may be prepared in known manner by reaction of the corresponding aldehydes or ketones corresponding to the following general formula ($R_5$ and $R_6$ having the meaning defined above) :

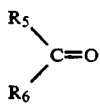

with suitable hydroxylamines of the type described hereinafter.

The aldehydes or ketones used may be selected from those already mentioned above as examples. Preferred aldehydes and ketones include isobutyraldehyde, 2-ethylhexanal, hexahydrobenzaldehyde, cyclopentanone, cyclohexanone, methylcyclohexanone, acetone, methyl ethyl ketone and methyl isobutyl ketone.

The hydroxylamines may be in particular organic compounds containing at least 1 aliphatic amino group and at least 1 aliphatically bound hydroxyl group. Although hydroxylamines containing aromatically or cycloaliphatically bound amino or hydroxyl groups may be used, they are less preferred. The hydroxylamines generally have a molecular weight of from 61 to 500, preferably from 61 to 300.

The following are examples of suitable hydroxylamines : bis(2-hydroxyethyl)-amine, bis(2-hydroxypropyl)-amine, bis(2-hydroxybutyl)-amine, bis(3-hydroxypropyl )-amine, bis(3-hydroxyhexyl)-amine, N-(2-hydroxypropyl )-N-(2-hydroxyethyl)-amine, 2-(methylamino)-ethanol, 2-(ethylamino)-ethanol, 2-(propylamino)-ethanol, 2-(butylamino)-ethanol, 2-(hexylamino)-ethanol, 2-(cyclohexylamino)-ethanol, 2-amino-2-methyl-1-propanol, 2-amino-2-ethyl-1-propanol, 2-amino-2-propyl-1-propanol, 2-amino-2-methyl-1,3-propanediol, 2-amino-3-methyl-3-hydroxybutane, propanolamine and ethanol amine.

The following are particularly preferred:bis(2-hydroxy-ethyl)-amine, bis(2-hydroxypropyl )-amine, bis(2-hydroxy-butyl )-amine, bis(3-hydroxyhexyl )-amine, 2-(methylamino)-ethanol, 2-(ethylamino)-ethanol, 2-amino-2-methyl-1-propanol, 2-amino-2-ethyl-1-propanol, propanolamine and ethanolamine.

When component (B) contains oxazolane groups it can be prepared by allowing to react the above-defined reactants in such quantitative ratios that based on the carbonyl groups of the aldehydes or ketones, the hydroxy amines are present in 1 to 1.5 times the equivalent quantity in the oxazolane formation. Catalytic quantities of acidic substances, e.g. p-toluene sulphonic acid, hydrogen chloride, sulphuric acid or aluminium chloride, may be used to accelerate the reaction. A suitable reaction temperature is in the range of 60° to 180 ° C., the water formed in the reaction being removed by distillation using an entraining agent as described in U.S. Pat. No. 4,975,493.

To produce components (B) having in their molecule a plurality of oxazolane moieties, mono-oxazolanes according to the above mentioned general formula (V) are allowed to react through hydrogen on their nitrogen atom with a polyfunctional reactant, e.g. polyisocyanate, polyepoxide, polycarboxylic acid, partially esterified polycarboxylic acid or polyacid anhydride. The reaction with organic polyisocyanates is preferred and may be carried out as described in DE-OS 2 446 438.

Examples of polyisocyanates which are suitable for this modifying reaction are aliphatic, cycloaliphatic, araliphatic, aromatic or heterocyclic polyisocyanates, such as those described, e.g. by W. Siefken in Justus Liebigs Annalen de Chemie, 562, p. 75 to 136, e.g. 1,4-tetramethylene diisocyanate, 1,6-hexamethylene diisocyanate, 1,12-dodecane diisocyanate. cyclobutane1,3-diisocyanate, cyclohexane 1,3-diisocyanate, cyclohexane 1,4-diisocyanate, 1-isocyanato-3,3,5-trimethyl-5-isocyanatomethylcyclohexane, 1,4- and 2,6-hexahydrotoluylene diisocyanate, hexahydro-1,3- and -1,4-phenylene diisocyanate, 1,3-phenylene diisocyanate, 1,4-phenylene disocyanate, diphenylmethane-2,4'- and/or 4,4'-diisocyanate, naphthylene 1,5-diisocyanate, mixtures of these and other polyisocyanates, polyisocyanates having carbodiimide groups (as described e.g. in German Patent Specification 1,092,007), polyisocyanates having allophanate groups (as described e.g. in GB-P 994,890), polyisocyanates having isocyanurate groups (as described e.g. in German Patent Specifications 1,022,789 and 1,222,067) polyisocyanates having urethane groups (as described e.g. in U.S. Pat. No. 3,394,164) or polyisocyanates prepared by reaction of at least one difunctional hydroxyl compound with excess of at least one difunctional isocyanate, polyisocyanates having biuret groups (as described e.g. in German Patent Specification 1,101,394) and prepolymer or polymer substances having at least two isocyanate groups.

Examples of suitable polyisocyanate compounds are further given in the book High Polymers, Volume XVI dealing with "Polyurethanes, Chemistry and Technology" Interscience Publishers, New York, London, and further also in Volume I, 1962, p. 32–42 and 45–54 and Volume II, 1964, p. 5–6 and 198–199, and also in Kunststoffhandbuch (Handbook of Plastics), Volume VI, Vieweg-Höchtlen, Carl-Hanser Verlag, Munich, 1966, p. 45–71.

Particularly preferred polyisocyanates for preparing polyfunctional oxazolanes are low molecular weight (cyclo)aliphatic diisocyanates, e.g. : hexamethylene diisocyanate, isophorone diisocyanate, 4,4'-diisocyanatodicyclohexylmethane or relatively high molecular weight isocyanate prepolymers based on such diisocyanates.

According to a preferred embodiment in the formation of polyfunctional oxazolanes said preferred polyisocyanates are allowed to react with monooxazolanes according to the above-mentioned general formula (VI) wherein nitrogen is linked to a $HO-CH_2-CH_2-$ group to form an urethane linkage, $R_5$ represents hydrogen, $R_6$ an ethyl-1-pentyl group, and $R_7$ is an ethylene group.

Polyepoxides suitable for use in the preparation of polyfunctional oxazolanes are organic compounds containing at least two epoxide groups.

Preferred polyepoxides for such use are aliphatic bisepoxides having epoxide equivalent weights of 43 to 300, e.g. 1,3-butadiene bisepoxide, 1,5-hexadiene bisepoxide, ethylene glycol diglycidyl ether, glycerol-1,3-diglycidyl ether, 3,4-epoxycyclohexyl, methyl-3',4'-epoxycyclohexane carboxylate, and adipic acid-(3,4-epoxycyclohexyl)-bisester.

Still other methods of preparing oxazolanes of relatively high functionality are described in the already mentioned U.S. Pat. No. 4,975,493.

The molecular weight and functionality of the oxazolanes of relatively high functionality may be adjusted readily through the choice of the reactants.

For use according to the present invention in the preparation of a moisture-curable polymeric composition for edge-reinforcement of a phosphor screen, di- and/or trifunctional oxazolanes are applied preferably in conjunction with a copolymer of maleic anhydride and other monomers, e.g. styrene, methyl methacrylate and butyl acrylate, containing at least 10% by weight of polymerised maleic anhydride units.

The following illustrates in detail the preparation of specific components (A) and (B) suited for use according to the present invention.

I. Preparation of the Maleic Anhydride Copolymers A

General procedure for preparing the maleic anhydride copolymers $A_1$–$A_9$ mentioned in Table 1 under the heading MSA-copolymers A:

Part I is introduced initially into a reaction vessel equipped with a stirring, cooling and heating system, heated to the reaction temperature. Part II is added over a period of 3 hours and part III over a period of 3.5 hours, followed by stirring for 2 hours.

The reaction temperatures and the composition of parts I–III are shown in the following Table 1 together with the solids content and viscosity of the maleic anhydride (MA) copolymer solutions obtained.

TABLE 1

| | MA-Copolymers A (Quantities in g) | | | | | | | | |
|---|---|---|---|---|---|---|---|---|---|
| | $A_1$ | $A_2$ | $A_3$ | $A_4$ | $A_5$ | $A_6$ | $A_7$ | $A_8$ | $A_9$ |
| Part I | | | | | | | | | |
| Butyl acetate | 1050 | 1534 | 1400 | | | 798 | 1670 | | 1500 |
| Methoxypropyl acetate | | | | 1200 | 800 | | | 1891 | |
| Xylene | | | | | | | 3300 | | |
| Part II | | | | | | | | | |
| Xylene | | | | | | | 1400 | | |
| Methyl methacrylate | 859 | 780 | 1025 | | 600 | 675 | 1080 | | 120 |
| Styrene | 313 | 180 | 341 | 450 | 30 | 350 | 3360 | 1013 | 870 |
| Butyl acrylate | 300 | 300 | 732 | 675 | 327.5 | 1056 | 4560 | 563 | 1410 |
| Glycidyl methacrylate | | 120 | | | | | | | |
| Maleic anhydride | 284 | 120 | 244 | 375 | 40 | 425 | 2400 | 300 | 480 |
| Hexanediol bisacrylate | | | | | 2.5 | | | | |
| Butyl acetate | | | | | | 1275 | 1000 | | 449 |
| n-Dodecylmercaptan | | | | | 10 | | | | |
| Part III | | | | | | | | | |
| 2,2'-azobis(isobutyronitrile) | | | | 30 | 20 | | | | |
| Ditert.butyl peroxide | | | | | | | 600 | | |
| tert.-butyl peroctoate (70%) | 105 | 86 | 140 | | | 105 | | 233 | 171 |
| Xylene | | | | | | | 600 | | |
| Methoxypropyl acetate | | | | 330 | 200 | | | | |
| Butyl acetate | 360 | | 118 | | | | | | |
| Reaction temperature (°C.) | 115 | 120 | 120 | 130 | 120 | 126 | 150 | 145 | 125 |
| Solids content (%) | 55.2 | 50.0 | 60.4 | 55.7 | 40.6 | 56.4 | 60.0 | 49.3 | 59.5 |
| Viscosity (mP · s) | 11100 | 900 | | 18700 | | 576 | 1100 | 1100 | 2100 |
| Anhydride equivalent weight (g) (theory) (1 mol MA/1 mol sec. amine) | 605 | 1225 | 940 | 392 | 2450 | 578 | 465 | 613 | 588 |

II. Preparation of Blocked Polyamines B

B1) The bisketimine B 1 is obtained from 680 g of isophoronediamine, 1000 g of methyl isobutyl ketone and 560 g of toluene after separation of 46 g of water (theoretical quantity : 144 g) at 120° C. and subsequent distillation.

B 2) 200 g of isobutyraldehyde and 133 g of cyclohexane are introduced under nitrogen atmosphere into a 1-1 reaction vessel equipped with stirring, cooling and heating means and the reaction mixture is cooled to 10° C. in an ice bath. Thereupon 176.6 g of 1-amino-3-(methylamino)-propane are slowly added dropwise and the reaction mixture is stirred at 10° C. for one hour. It is then heated to reflux temperature until 52 g of water have separated off. After removal of the solvent and unreacted blocking agent by distillation hexahydropyrimidine is obtained.

B 3) By transforming propionic anhydride and aminoethanol by refluxing in xylene under azeotropic elimination of the reaction water (H. L. Wehrmeister, J. Org. Chem., 26, 3821 (1961)) a monooxazoline as defined hereinafter by structural formula is obtained that is purified by distillation:

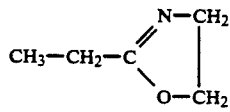

99 g of this monooxazoline, 88 g of ethylene carbonate and 0.4 g of lithium chloride are heated at 150° C. for 12 h. After distillation the colourless, bicyclic amidacetal crosslinking agent B 3) is obtained.

B 4) By transforming 528 g of 1-amino-3-methylaminopropane and 360 g of acetic acid in 99 g of toluene and elimination of the reaction water at 100° to 130° C. a tetrahydropyrimidine precursor is obtained (theor.: 216 g; found : 212.5 g), which after distillation is obtained in about 90% yield as a bright and colourless liquid.

112 g of tetrahydropyrimidine precursor are made to react in 200 g of butyl acetate with 87 g of ethylene glycol diglycidyl ether at 120° to 130° C. for 5 h. After adding charcoal the reaction mixture is stirred for still 1 h, and filtered off unter nitrogen atmosphere. A yellow solution (about 50%) of the difunctional bicyclic amidaminal B 4) is obtained.

Preparation of mono-oxazolanes and poly-oxazolanes B

General procedure

To prepare the mono-oxazolanes, the hydroxyamines, the carbonyl compounds and, optionally, the entraining agent are mixed and 0.01 to 0.1% of an acidic catalyst is added optionally to the resulting mixture. The reaction mixture is then heated under reflux in an inert gas atmosphere (e.g. $N_2$, Ar) on a water separator until the theoretical quantity of water has separated off or until no more water separates off. The products thus obtained may be used for the combinations according to the invention without any further purification or separation step. When the purity or uniformity of the products has to meet particularly exacting requirements, the products may be purified, e.g. by vacuum distillation.

B 5) The mono-oxazolane B 5) is obtained from 210 g of diethanolamine, 158.4 g of isobutyraldehyde and 92.1 g of xylene after separation of 34.2 g of water (theoretical quantity:36 g).

B 6) 536 g of trimethylolpropane, 1368 g of ε-caprolactone, 476 g of dimethyldiglycol and 0.4 g of an esterification catalyst (tin dioctoate) are heated together to 140° C. for 4 h. Thereupon 297.5 g of the trimethylolpropane/ε-caprolactone adduct thus prepared and 265.0 g of oxazolane B 5) are heated together to 50° C. After the dropwise addition of 252 g of hexamethylene diisocyanate, the mixture is stirred at 70° C. for 6 h. The poly-oxazolane B 6) is obtained in the form of a 70% solution after the addition of 113 g of dimethyl diglycol.

B 7) The mono-oxazolane B 7) is obtained by condensation reaction from 210 g of diethanolamine, and 281.6 g of 2-ethylhexanal in 122.9 g of cyclohexane after separation of 35 g of water (theoretical quantity : 36 g).

B 8) 400 g of an aliphatic polyisocyanate containing biuret groups and based on the reaction with water of hexamethylene diisocyanate and 397 g of butyl acetate are introduced into a 2-liter reaction vessel vessel equipped with stirrer, condenser and heating device. After the dropwise addition of 526.1 g of the oxazolane of diethanolamine and 2-ethyl hexanal described in B 7), the temperature of the reaction mixture is maintained at 70° C. for 11 h. An approximately 70% solution of poly-oxazolane agent B 8) containing a statistical average of 3 oxazolane groups pro macromolecule is obtained, i.e. 1.754 mmol of oxazolane units are contained in 1 g of 70% wt solution.

B9)
step a) 296 g of phthalic anhydride, 324 g of cyclohexane dimethanol and 52 g of neopentyl glycol are weighed in a reaction vessel suitable for esterification under a nitrogen atmosphere and heated to 220° C. for 8 h. Water is separated until the acid number has reached or dropped below 2.5. The polyester precursor B 9 a) is obtained.

step b) 145.2 g of the polyester precursor obtained in said step a) and 113.4 g of methoxypropyl acetate are weighed into a 1-liter reaction vessel equipped with stirrer, condenser and heating device and heated to 60° C. Thereupon 119.5 g of the mono-oxazolane B 7) obtained from diethanolamine and 2-ethylhexanal is then added dropwise and stirring is continued at 70° C. for 3 h. After the addition of 318.4 g of polyester precursor B 9 a), the temperature is maintained at 70° C. for 11 h and cross-linking agent B 9) which is a polyester-based poly-oxazolane is then obtained as a 70% solution.

B 10) poly-oxazolane is prepared from 187.8 g of an isocyanurate polyisocyanate, which has been prepared by partial trimerisation of the NCO groups of hexamethylene diisocyanate in accordance with EP-A-No. 10589 and which has an NCO content of 21.45% by weight, and 1623 g of oxazolane (obtained as described for B 5) but from 1728 g of methyl ethyl ketone and 2100 g of diethanolamine). The highly viscous product is dissolved in butyl acetate to from a 70% solution. The solution has a viscosity of 900 mPa.s at 23° C.

B 11) polyoxazolane is prepared from 840 g of hexamethylene diisocyanate and 2360 g of oxazolane B 7). The product has a viscosity of 4000 mPa.s at 23° C.

In the preparation of a preferred coating composition for use according to the present invention a mixture of components (A) and (B) is made in a water-free organic non-aromatic solvent or solvent mixture. The solvent(s) are used in a quantity necessary to obtain the required coating composition viscosity adapted to the applied coating system. The quantity of solvent may be kept fairly small by applying low molecular weight maleic anhydride copolymers.

According to a particular embodiment dispensing with solvent removal after coating, a liquid monomer or mixture of monomers is used that acts as solvent for the applied components (A) and (B). Said monomer or mixture of monomers, which has not to be removed by evaporation, can be polymerised at elevated temperature in the presence of a thermally activatable radical former for addition polymerisation.

The hardening of the binder obtained by reaction of components (A) and (B) proceeds quickly in the presence of atmospheric moisture entering the coating after its application. The hardening may be accelerated by heat e.g. in the temperature range of 40° to 130 ° C., temperature at which applied solvents are removed by evaporation.

The edge-reinforcing coating applied according to the present invention may be applied to any type of radiographic screen, e.g. such screen in the form of panel or sheet, but also to screens in the form of a web or belt and containing any type of phosphor in a binder layer.

Examples of solvents employable in the coating of the moisture-curable edge-reinforcing polymer composition are ketones such as acetone, butanone, methyl ethyl ketone, methyl isobutyl ketone, cyclohexanone, isophorone; esters of lower alcohols and lower aliphatic acids such as methyl acetate, ethyl acetate and butyl acetate; ethers such as ethylene glycol monoethylether, methyl glycol, dimethyl glycol and methyl glycol acetate.

A non-limitative survey of phosphors that may be used in radiographic screens edge-reinforced according to the present invention is given hereinafter.

In the case of a conventional X-ray conversion screen the phosphor used is a fluorescent substance that emits promptly ultraviolet radiation and/or visible light when struck by penetrating X-ray radiation.

The phosphor can be selected from a variety of well-known X-ray luminescent phosphors or phosphor particles taught by the prior art. The phosphors include, for example, calcium tungstate, zinc sulfide, zinc cadmium sulfide, zinc oxide and calcium silicate, zinc phosphate, alkali halides, cadmium sulfide, cadmium selenide, cadmium tungstate, magnesium fluoride, zinc fluoride, strontium sulfide, zinc sulfate, barium lead sulfate, barium fluorohalides, and mixtures of two or more of the above. The above phosphors may be activated with, for example, europium, silver, copper, nickel. Phosphors which are particularly suitable for use in high speed X-ray conversion screens are those selected from fluorescent substances containing elements with atomic number 39 or 57 to 71, which include rare earth elements such as yttrium, gadolinium, lanthanum and cerium. Particularly suitable are the rare earth oxysulfide and oxyhalide fluorescing materials activated with other selected rare earths e.g. lanthanum and gadolinium oxybromide and oxychloride activated with terbium, ytterbium or dysprosium, lanthanum and gadolinium oxysulfides activated with terbium, europium, or a mixture of europium and samarium, yttrium oxide activated with gadolinium, europium, terbium or thulium, yttrium oxysulfide activated with terbium or a mixture of terbium and dysprosium, yttrium tantalate doped with small amounts of terbium or strontium or lithium or a mixture thereof and activated with thulium, niobiumn, europium, gadolinium, neodymium. These and other rare earth fluorescent materials have been described extensively in the literature for which we refer, e.g., to EP 11909, EP 202875, EP 257138, DE-P 1282819, DE-P 1952812, DE-P 2161958, DE-P 2329396, DE-P 2404422, FR-P 1580544, FR-P 2021397, FR-P 2021398, FR-P 2021399, GB-P 1206198, GB-P 1247602, GB-P 1248968, U.S. Pat. Nos. 3 546 128, 3 725 704, 4 220 551, 4 225 653, also to K. A. Wickersheim et al."Rare Earth Oxysulfide X-ray Phosphors", in the proceedings of the IEEE Nuclear Science Symposium, San Francisco, Oct. 29–31, 1969, to S. P. Wang et al., IEEE Transactions on Nuclear Science, February, 1970, p. 49–56, and to R. A. Buchanan, IEEE Transactions on Nuclear Science, February, 1972, p. 81–83. A survey of blue light and green light emitting phosphors is given in EP 88820.

By using a plurality of phosphor layers of different composition or by using a radiographic screen containing a mixture of different phosphors a fluorescence over the whole visible spectrum can be obtained, so that such combination is particularly useful for recording with silver halide recording elements that have been made spectrally sensitive to light of the whole visible spectrum.

A particularly preferred two-layer phosphor combination comprises coating on a support as described hereinafter a first phosphor layer on the basis of $(Y,Sr,Li)TaO_4.Nb$, as disclosed in EP-A-0 202 875, and thereon a second phosphor layer on the basis of $CaWO_4$. To either of these phosphor layers, in particular to the first phosphor layer may be added colorants in view of the enhancement of the image sharpness. Suitable colorants for this purpose are disclosed in e.g. EP-0 178 592 and U.S. Pat. No. 3 164 719.

A radiographic screen comprising a phosphor layer combination on the basis of $CaWO_4$ and in particular $SrYTaO_4$ is described in EP-A-0 240 272.

In a stimulable X-ray conversion screen phosphors are used which exhibit stimulated fluorescence when irradiated with a stimulating excitation light after X-ray irradiation. From the viewpoint of practical use, the stimulable phosphor is desired to give stimulated emission in the wavelength region of 300 to 700 nm when excited with stimulating rays in the wavelength region of 400 to 900 nm. Alternatively, stimuable phosphors emitting around 600 nm. such as described in U.S. Pat. No. 4 825 085, can be used. As the stimulable phosphor to be used, there may be mentioned, for example, those described in EP 304121, EP 345903, EP 353805, published EP-A 0 304 121, 0 345 903, 0 345 904 and 0 345 905, U.S. Pat. No. 3 859 527, 4 236 078, 4 239 968, published JP 73/80487, JP 73/80488, JP 73/80489, JP 76/29889, JP 77/30487, JP 78/39277, JP 79/47883, JP 80/12142, JP 80/12143, JP 80/12144 =U.S. Pat. No. 4 236 078, JP 80/12145, JP 80/84389, JP 80/160078, JP 81/116777, JP 82/23673, JP 82/23675, JP 82/148285, JP 83/69281 and JP 84/56479. Preference is given to divalent europium activated alkaline earth (Ba, St) fluorohalide phosphors because these show stimulated emission of high luminance.

The stimulable X-ray conversion screen may contain a plurality of stimulable phosphor layers comprising at least one of the stimulable phosphors as mentioned above. The stimulable phosphors to be contained in respective stimulable phosphor layers may be either identical or different.

The stimulable phosphors can be used in any conventional particle size range and distribution. It is generally appreciated that sharper images with less noise are realized with smaller mean particle sizes, but light emission efficiency declines with decreasing particle size. Thus, the optimum mean particle size for a given application is a reflection of the balance between imaging speed and image sharpness desired.

While it is recognized that the phosphor layer does not have to contain a binder, in most applications the phosphor layers contain sufficient binder to give structural coherence to the layer. In general, the binders useful in the practice are those conventionally employed in the art and include proteins such as gelatin, polysaccharides such as dextran, gum arabic, and synthetic polymers such as polyvinyl butyral, polyvinyl acetate. nitrocellulose, ethylcellulose, vinylidene chloride-vinyl chloride copolymer, polyalkyl (meth)acrylate, vinyl chloride-vinyl acetate copolymer, polyurethane, cellulose acetate, cellulose acetate butyrate, polyvinyl alcohol, polystyrene, polyester, etc. These and other useful binders are disclosed e.g. in U.S. Pat. No. 2 502 529, 2 887 379, 3 617 285, 3 300 310. U.S. Pat. Nos. 3 300 311 and 3 743 833. A mixture of two or more of these binders may be used. e.g., a mixture of polyethyl acrylate and cellulose acetobutyrate.

According to a very interesting embodiment the polymeric coating composition applied for providing edge-reinforcement according to the present invention is used also as the binder for the phosphor particles of the phosphor layer.

The ratio between of binder to phosphor may be determined according to the characteristics of the aimed radiographic screen and the nature of the phosphor employed. Generally, the ratio therebetween is within the range of from 1:1 to 1:100 (binder:phosphor, by weight), preferably from 1:10 to 1:25.

The thickness of the phosphor layer, which may differ depending on the sensitivity of the radiographic screen to radiation, the kind of the phosphor, etc., may be within the range of from 10 to 1000 $\mu$m, preferably from 50 to 500 $\mu$m, more preferably from 150 to 250 $\mu$m.

Two or more phosphor layers with different thickness and/or different binder:phosphor ratio and/or different phosphor particle size may be used.

According to a particular embodiment is in the form of a gradual screen, i.e. a screen having a gradual intensification along its length and/or width. This can be achieved by gradually increasing the thickness of the phosphor layer or by graduality in the amount of a dye capable of absorbing light emitted by the phosphor, e.g. dye present in the protective layer.

The support of the of the phosphor screen material may be a cardboard support but for high strength is preferably a metal or hydrophobic resin film support. Examples of such supports include plastic films such as films of cellulose acetate, polyvinyl chloride, polyvinyl acetate, polyacrylonitrile, polystyrene, polyester, polyethylene terephthalate, polyamide, polyimide, cellulose triacetate and polycarbonate.

Metal supports are made e.g. of aluminum foil or an aluminum alloy foil.

The plastic film may contain a light-absorbing material such as carbon black, or may contain a light-reflecting material such as titanium dioxide or barium sulfate. The former is appropriate for preparing a high-resolution type radiographic screen, while the latter is appropriate for preparing a high-sensitivity type radiographic screen.

Examples of preferred supports include polyethylene terephthalate, clear or blue colored or black colored (e.g., LUMIRROR C, type X30 supplied by Toray Industries, Tokyo, Japan), polyethylene terephtalate filled with $TiO_2$ (preferably anatase) or with $BaSO_4$.

These supports may have thicknesses which may differ depending on the material of the support, and may generally be between 60 and 1000 $\mu$m, more preferably between 80 and 500 $\mu$m from the standpoint of handling.

For coating the phosphor layer the following procedure may be followed.

Phosphor particles and a binder are added to an appropriate solvent as described hereinafter, and then mixed to prepare a coating dispersion comprising the phosphor particles homogeneously dispersed in the binder solution. Said coating dispersion may further comprise a dispersing agent and plasticizer and filler material as described hereinafter.

The coating dispersion containing the phosphor particles and the binder is applied uniformly onto the surface of the support to form a layer of the coating dispersion. The coating procedure may proceed according to any conventional method such as doctor blade coating, dip-coating or roll coating.

After applying the coating dispersion onto the support, the coating dispersion is then heated slowly to dryness so as to complete the formation of a phosphor layer.

Examples of the solvent employable in the preparation of the phosphor coating dispersion include lower alcohols such as methanol, ethanol, n-propanol and n-butanol; chlorinated hydrocarbons such as methylene chloride and ethylene chloride; ketones such as acetone, butanone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether; methyl glycol; and mixtures of the above-mentioned compounds.

Dispersing agents may be used to improve the dispersibility of the phosphor particles in the coating composition, and a variety of additives such as a plasticizers may be used for increasing the bonding between the binder and the phosphor particles in the phosphor layer.

Examples of the dispersing agents include ionic and nonionic well-known dispersing agents or combinations thereof, e.g., GAFAC RM 610 (tradename) supplied by General Aniline and Film Company (GAF), New York, USA, being polyoxyethylene (20) sorbitan monopalmitate and monolaurate, polymeric surfactant such as acrylic graft copolymer, PHOSPHOLIPON 90 (tradename) supplied by Nattermann-Phospholipid GmbH, Köln, W. Germany, silane dispersing agents such as SILANE Z6040 (tradename) supplied by Dow Corning Corporation, Midland, Mich., U.S.A. or glymo 3-glycidyloxypropylmethoxysilane or organosulfate polysilanes, unsaturated p-aminamide salts and high molecular acid esters such as ANTI TERRA U 80 (tradename) supplied by BYK-Chemie GmbH. Wesel. W. Germany, high molecular unsaturated polyesters. Dispersing agents are added in an amount of 0.05 to 10% by weight as compared to the phosphor.

Examples of plasticizers include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The phosphor coating dispersion may contain a filler (reflecting or absorbing) or may be colored by a colorant capable of absorbing light within the spectrum emitted by the phosphor or capable of absorbing excitation light in the case of a stimulable X-ray conversion screen. Examples of colorants include Solvent Orange 71 (Diaresin Red 7), Solvent Violet 32 (Diaresin Violet A), Solvent Yellow 103 (Diaresin Yellow C) and Solvent Green 20 (all four supplied by Mitsubishi Chemical Industries, Japan), Makrolex Rot GS, Makrolex Rot EG, Makrolex Rot E2G, Helioechtgelb 4G and Helioechtgelb HRN (all five supplied by Bayer, Leverkusen, W. Germany), Neozaponfeuerrot G and Zaponechtbraun BE (both supplied by BASF, Ludwigshafen, W. Germany).

The packing density of the phosphor particles can be improved by an ultrasonic treatment resulting in de-aeration of the phosphor-binder combination. Packing density may also be improved by a pressure treatment such as calendering.

The phosphor layer can be provided onto the support by methods other than those given above. For instance, the phosphor is initially prepared on a sheet (temporary support) such as a glass plate, metal plate or plastic sheet using the aforementioned coating dispersion and then thus prepared phosphor layer is superposed on the permanent support by pressing or using an adhesive agent.

The phosphor layer may be applied binderless to the support by a method such as vapor deposition, sputtering and electrodeposition.

In the preparation of a radiographic screen, one or more additional layers are provided occasionally between the support and the phosphor layer, so as to enhance the bonding between the support and the phosphor layer, or to improve the sensitivity of the screen or the quality of an image provided thereby. Such adhesive layer or primer layer may be formed by means of a radiation curable coating composition as described e.g. in published European patent application 0 522 609.

A light-reflecting layer or a light-absorbing layer may be coated on the support either as a backing layer or interposed between the support and the the phosphor layer. For example, such layer contains a light-reflecting material such as titanium dioxide or a light-absorbing material such as carbon black. One or more of these additional layers may be provided on the support.

On the surface of the phosphor layer not facing the support, a protective overcoat may be provided.

Said protective overcoat may be formed by a process in which a coating liquid containing at least one of a radiation curing type resin is applied onto the face of the (stimulable) phosphor layer and is subjected to irradiation by ultraviolet rays or electron beam to carry out curing of the coating liquid. Suitable coating compositions for said protective overcoat and their application by screen-printing are described in published European patent application 0 510 753.

The monomers and prepolymers in said coating composition are selected in order to provide a crosslinking reaction for forming a solvent insoluble layer having good abrasion resistance.

The radiation curing type resin is e.g. an unsaturated polyester or an urethaneacrylate.

To the prepolymer which is the abovementioned radiation curing type resin, there may be added, if necessary, a vinylmonomer as a reactive diluent, a non-reactive binder, a crosslinking agent, a photoinitiator, a photosensitizer, a storage stabilizer, a colorant, and other additives, and then dispersed therein to prepare the coating liquid for the protective layer. Examples of colorants that can be used in the protective layer include MAKROLEX ROT EG, MAKROLEX ROT GS and MAKROLEX ROT E2G (tradenames), all three supplied by Bayer AG, Leverkusen, Germany.

A difunctional acrylate e.g. hexane diol diacrylate is preferably added as reactive diluent in an amount of between 0 and 80% by weight, preferably between 10 and 30% by weight. Higher functional acrylates would yield hard and brittle layers.

In UV-curing the amount of the photoinitiator used is preferably within the range of 0.01 to 5 parts by weight relative to 100 parts by weight of the prepolymer. In particular, the photoinitiator is preferably used in an amount of 0.5 to 3 parts by weight and within the range of 3 to 7 times the amount of the radical-generating compound used.

To avoid the use of photoinitiators in curing the curing proceeds by means of electron beam (EB-curing). EB-curing is described e.g. in the periodical Adhäision 1990- Heft 12, pages 39-40.

A variety of materials can be included in said surface coating of the radiographic screen, e.g. materials reducing static electrical charge accumulation, plasticizers, matting agents, lubricants, aleroamers and the like.

Examples of lubricants that may be added include silicones such as SURFACTANT 190 (tradename) supplied by Dow Corning Corporation, Midland, Mich., U.S.A., fluorine containing compounds such as polytetrafluoroethylene and LANCO WAX (tradename) supplied by Georg M. Langer & Co., Bremen, W. Germany, waxes such as ACRAWAX (tradename) supplied by Glyco Products, New York, USA and LANCO GLIDD (tradename) supplied by Georg M. Langer & Co., Bremen, W. Germany. The lubricants are added in amounts varying between 0.01 and 0.5% by weight. Examples of defoamers that may be added include LANCO ANTIBUBBLE L (tradename) and LANCO FOAMSTOP PL (tradename) both supplied by Georg M. Langer & Co., Bremen, W. Germany.

Amounts of conventional antistatics may be added to the topcoat or to the phosphor active layer. Especially for the conventional X-ray conversion screens static electricity is usually built up during the exchange of the film in and out of the cassette containing the X-ray screens. This has been known to cause static marks by exposure of the sensitive photographic film.

Particularly useful antistatic substances for incorporation in the phosphor layer or in the protective overcoat are polyethylene oxides, preferably corresponding to the formula $RO-(CH_2CH_2O)n-H$ with $n=2$ and $R=$cetyl or stearyl or oleyl. These compounds are added preferably in an amount of 0.5-10% by weight, more preferably 2-4% by weight. Using these compounds in combination with anionic or cationic antistatic compounds (e.g. quaternary ammonium salts) leads to a synergistic effect.

The thickness of the protective layer may be within the range of from 1 to 100 μm, more preferably from 2 to 20 μm.

To form the protective layer, the composition is coated at a suitable wet thickness (preferably between 60 and 100 μm) and cured by subjecting it to radiation which converts it to a solid form. Any suitable method for coating a thin uni form layer of the composition can be employed. Examples of suitable coating methods include dip coating, air-knife coating, roll coating, extrusion coating, bead coating, curtain coating, screen printing coating, wire bar coating, etc.

The edges of the phosphor screen may have a retracted structure as defined in published European patent application (EP-A) 0 159 613 or may have chamfered form, e.g. is chamfered under an angle of 45°, to improve the smooth introduction of the screen between the nip of transport rollers.

The invention will now be illustrated hereinafter by means of examples. All ratios and percentages are by weight unless mentioned otherwise.

EXAMPLE I (COMPARATIVE EXAMPLE)

Preparation of the Radiographic Screen

A radiographic screen provided with a radiation cured protective coating was prepared as follows:

BaFBr:Eu storage phosphor particles were predispersed (80% by weight) in a low viscous presolution of binder, together with a dispersant, by stirring for 5 minutes at 1700 rpm. The presolution consisted of 7% by weight of polyethyl acrylate binder (PLEXISOL B 372 supplied by Röhm GmbH, Darmstadt, W. Germany), 18% by weight of ethylacetate, 50% by weight of methyl ethyl ketone, 24.5% by weight of methylglycol and 0.5% of GAFAC RM 610 (supplied by GAF, N.Y., USA). Subsequently, polyethyl acrylate binder and ethylacetate solvent was added to the phosphor predispersion so as to attain a solution with a solid content of 70%, with 89% by weight of phosphor against 11% of binder.

The obtained phosphor dispersion was applied to a black coloured subbed polyethylene terepthalate support by doctor blade coating (wet thickness 900 $\mu$m). After evaporation of the solvent a phosphor layer of 160 $\mu$m thickness was obtained.

Onto said phosphor layer a protective coating was applied from a radiation curable coating composition comprising 80% by weight of a mixture of 80% of an aromatic urethaneacrytate (EBC 220 supplied by UCB, Drogenbos, Belgium) and 20% of an aliphatic urethaneacrylate (EBC 264 supplied by UCB, Drogenbos, Belgium), 15% by weight of hexane diol diacrylate (HDDA), 4.5% by weight of photoinitiator 2-hydroxy-2-methyl-1-phenyl-propan-1-one (DAROCUR 1173 supplied by E. Merck, Darmstadt, W. Germany) and 0.5% by weight of a silicone surfactant. To this composition was added ethanol as solvent in an amount so as to obtain a 25 wt % solution.

The composition was applied onto the phosphor layer by dip coating (wet thickness about 100 $\mu$m). After evaporation of the solvent a protective topcoat layer having a thickness of 10–15 $\mu$m was obtained.

The coating was cured by UV radiation using a Labcure Unit supplied by Technigraf GmbH, Gravenwiesbach, W. Germany ($O_3$ removal, air cooling, energy output of 80 W/cm, velocity 5 m/min, distance UV source-substrate 11 cm).

The radiographic screen prepared according to this procedure is referred to below as screen I (without edge-reinforcement).

Preparation of Coating Composition for Performing Edge-reinforcement

A composition A was prepared as a 40% solution of poly-oxazolane B 8 in a 70/30 mixture of methyl ethyl ketone and butyl acetate.

A composition B was prepared as a 40% solution of MA-copolymer $A_7$ in a 55/45 mixture of methyl ethyl ketone and butyl acetate.

A composition C was prepared as a 40% solution of MA-copolymer $A_9$ in a 55/45 mixture of methyl ethyl ketone and butyl acetate.

Said compositions were mixed in a 50/50/32 ratio to form the coating composition for edge-reinforcement.

Figure 2:
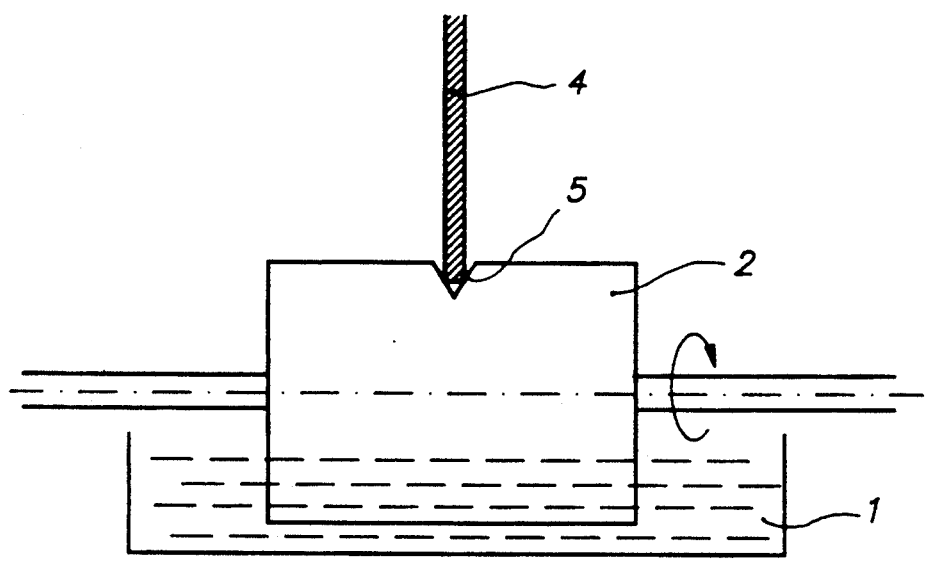
FIG. 2 is a diagrammatic side view representation of said coating device.

Said coating composition was applied onto the edges (side surfaces) of the screen (I) with an apparatus as illustrated in FIG. 1 and 2, wherein:

element 1 represents a coating tray containing the edge-reinforcing coating composition;

element 2 represents a rotating roller (diameter 3 cm) having a wedge-shaped groove with a depth of 2.5 mm and largest width of 2.5 mm). Said roller rotates at an angular speed of 150 rpm.

element 3 represents a doctor blade;

element 4 represents the radiographic screen, the edges of which are to be reinforced and which are dipped in the coating liquid taken up in said groove.

The excess amount of coating liquid was removed by the doctor blade 3 positioned near to the rotating drum 2 and the screen (I) 4 was removed countercurrently to the sense of direction of the rotation of the drum 2.

FIG. 2 is a diagrammatic side view according to the direction of arrow A in FIG. 1. Herein, the screen 4 is shown dipped in the peripheral groove 5 of the rotating drum 2. Hereby the edges of the screen 4 are wetted by the moisture-curable composition taken from the coating tray 1.

The amount of liquid curable composition adhering to the edges of the screen can be determined i.e. by controlling the viscosity of the coating composition, the latter parameter being determined by the amount of solvent present in said composition.

The wet thickness of the radiation curable composition transferred to the edges of the screen amounted to approximately 50 micron.

After evaporation of the solvent mixture under 70% relative humidity conditions a solid moisture-cured edge coating having a thickness of 10–15 $\mu$m was obtained.

The radiographic screen prepared according to this procedure is referred to below as screen II (with edge-reinforcement according to the present invention).

Figure 3:
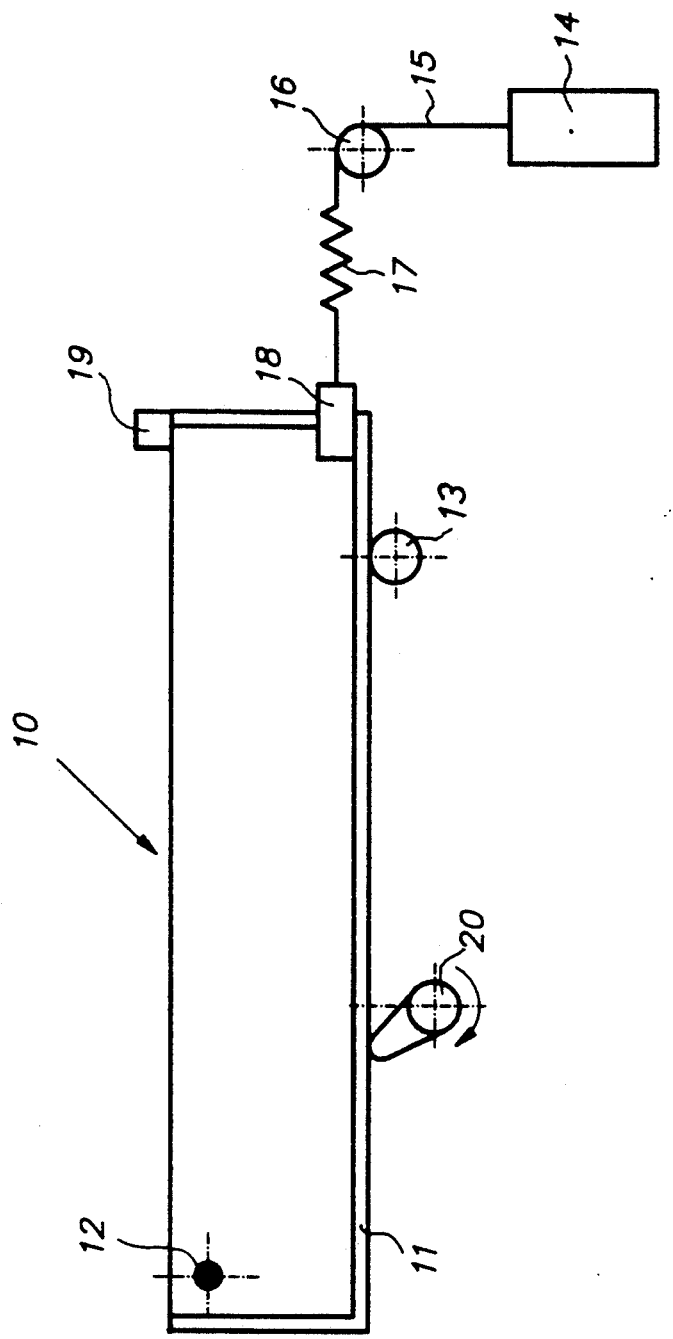
FIG. 3 is a diagrammatic front view representation of a testing device applied to check and evaluate the protection against mechanical shocks and abrasion provided by edge-reinforcement coatings on phosphor screens.

The so prepared screens I and II were evaluated on their shock and abrasion resistivity at their edges in a shock and abrasion test apparatus as illustrated in the accompanying FIG. 3.

For carrying out said test the screens I and II were cut to obtain strips of 20 cm $\times$ 4 cm. In FIG. 3. the strip to be tested is indicated by numeral 10 and its edge-coating (present in screen II) is indicated by numeral 11. The strip 10 is perforated in the left upper corner and rotably attached to a thin fixed bar 12 and supported by another fixed bar 13. The strip 10 is put under tension in horizontal direction by means of a weight 14 (400 g) attached to string 15 that is led over a pulley 16 and fixed to a spring 17 mounted with a clamp 18 to the strip 10. The strip 10 is put under downward pressure (vertical bias) against the fixed bar 13 bY means of a weight 19 (10 g) mounted in the right upper corner of the strip 10.

A rotating (500 rpm) camshaft 20 hammers against the edge of the strip to be tested.

The evaluation in abrasion resistance against said shock treatment was done by notifying the number of rotations of the camshaft before a visible damage occured in the point of the edge touched by the camshaft and at the point supported by the fixed bar 13.

The comparative screen I without edge-reinforcement showed a visible damage already at 100 rotations whereas the screen II edge-reinforced according to the present invention suffered a same degree of damage after 10,000 rotations which proves the enhanced durability of the screens edge-protected according to the present invention.

We claim:

1. A radiographic screen comprising (1) a metal or hydrophobic resin support, (2) a layer comprising a fluorescent phosphor dispersed in an organic polymeric binder and (3) an optionally present outermost organic polymer coating protecting said phosphor layer against abrasion, characterised in that the edges (side surfaces) of said screen are covered with a polymer material being formed essentially from a moisture-hardened polymer composition prepared by a process comprising the steps of :
   (I) mixing in at least one solvent following components (A) and (B)
   (A) 30 to 99 parts by weight of at least one copolymer of olefinically unsaturated compounds having a weight-average molecular weight [$\overline{Mw}$] of at least 1500 and containing chemically incorporated moieties capable of undergoing an addition reaction with amino groups, and
   (B) 1 to 70 parts by weight of organic substances containing blocked amino groups which are capable of forming under the influence of moisture free primary and/or secondary amino groups, wherein
   (i) the copolymers of component (A) contain intramolecularly bound carboxylic anhydride moieties, with the anhydride equivalent weight of the copolymers being from 393 to 9,800, and the still unhardened composition contains from 0.25 to 10 anhydride moieties for each blocked amino group,
   II) coating the obtained mixture onto at least one side surface (edge) of said fluorescent screen, and
   (III) allowing moisture ($H_2O$) to come into contact with the coated mixture essentially consisting of the above defined components (A) and (B).

2. Radiographic screen according to claim 1, wherein said component (A) consists essentially of a copolymer of:
   a) 3 to 25 parts by weight of maleic anhydride, and
   b) 75 to 97 parts by weight of at least one copolymerisable monomer selected from the group corresponding to the following general formulae (I), (II) and (III) :

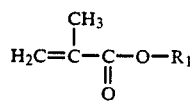

(I)

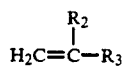

(II)

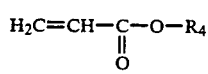

(III)

wherein :
each of $R_1$ and $R_4$ independently of each other represents an aliphatic or cycloaliphatic $C_1$-$C_{18}$ hydrocarbon group in which one or more carbon atoms may be replaced by heteroatoms selected from the group consisting of oxygen, sulphur and nitrogen,
$R_2$ is hydrogen, methyl, ethyl, chlorine or fluorine, and
$R_3$ is a $C_2$-$C_{15}$ aliphatic hydrocarbon group, a $C_5$-$C_{10}$ cycloaliphatic hydrocarbon group, a $C_7$-$C_{18}$ aliphatic hydrocarbon group, a $C_6$-$C_{12}$ aromatic hydrocarbon group containing one or more heteroatoms selected from the group consisting of oxygen, sulphur and nitrogen in the form of ether, ester, amide, urethane, urea, thioester, oxirane, ketone, lactam or lactone group; and
wherein component (B) is a compound selected from the group consisting of an aldimine, ketimine, oxazolane, hexahydropyrimidine, tetrahydroimidazole, dihydroimidazole, tetrahydropyrimidine, amidacetal and amidaminal.

3. Radiographic screen according to claim 2, wherein said maleic anhydride copolymers (A) have a weight-average molecular weight [$\overline{Mw}$] determined by gel chromatography of 3,000 to 50,000, and their anhydride equivalent weight (=quantity in gram containing 1 mole of anhydride groups) is from 3,800 to 393.

4. Radiographic screen according to claim 2, wherein said maleic anhydride copolymers (A) contain styrene, methacrylate and/or acrylate units.

5. Radiographic screen according to claim 1, wherein component (B) contains a statistical average of from 1 to 50 structural units corresponding to at least one of the following general formulae (IV), (V), (VI), (VII), (VIII) and (IX):

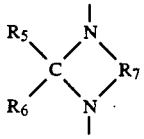

(IV)

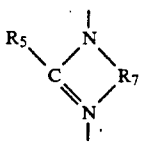

(V)

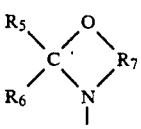

(VI)

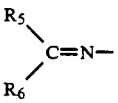

(VII)

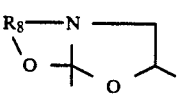

(VIII)

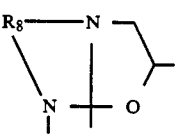

(IX)

wherein :
each of $R_5$ and $R_6$ independently of each other represents hydrogen, an aliphatic hydrocarbon group containing from 1 to 18 carbon atoms, a cycloaliphatic hydrocarbon group containing from 5 to 10 carbon atoms, an araliphatic hydrocarbon group containing from 7 to 18 carbon atoms or a phenyl group, or $R_5$ and $R_6$ represent together the necessary atoms to form a five- or six-membered cycloaliphatic ring with the carbon atom whereto they are commonly linked, $R_7$ represents a divalent aliphatic hydrocarbon group containing 2 to 6 carbon atoms, but having only a chain of 2 to 3 carbon atoms between the defined heteroatoms of the ring, $R_8$ represents a divalent aliphatic hydrocarbon group having 2 to 10 carbon atoms, but having only 2 or 3 carbon atoms between the heteroatoms whereto said group is linked.

6. Radiographic screen according to claim 5, wherein said blocked amines have a molecular weight of from 86 to 10,000.

7. Radiographic screen according to claim 5, wherein component (B) is a polyoxazotane obtained by allowing to react a mono-oxazolane according to said general formula (V) through hydrogen on its nitrogen atom with a polyfunctional reactant selected from the group consisting of a polyisocyanate, polyepoxide, polycarboxylic acid, partially esterified polycarboxylic acid or polyacid anhydride, and said polyfunctional reactant is an aliphatic, cycloaliphatic, araliphatic, aromatic or heterocyclic polyisocyanate.

8. Radiographic screen according to claim 1, wherein the hardening of the binder obtained by reaction of components (A) and (B) has been obtained by atmospheric moisture entering the coating after its application.

9. Radiographic screen according to claim 1, wherein the hardening is accelerated by heat in the temperature range of 40° to 130 ° C., temperature at which applied solvents are removed by evaporation.

10. Radiographic screen according to claim 1, wherein the edge-reinforcing coating has been applied to a screen in the form of panel, sheet, web or belt and containing any type of phosphor in a binder layer.

11. Radiographic screen according to claim 1, wherein the solvent(s) employed in the coating of said components (A) and (B) are selected from the group consisting of ketones and esters of lower alcohols and lower aliphatic acids.

12. Radiographic screen according to claim 1, wherein at least one side surface of the screen has a chamfered form.

* * * * *